United States Patent
Li et al.

(10) Patent No.: US 9,256,597 B2
(45) Date of Patent: Feb. 9, 2016

(54) SYSTEM, METHOD AND COMPUTER PROGRAM FOR CORRECTING MACHINE TRANSLATION INFORMATION

(71) Applicants: Ming Li, Waterloo (CA); Yang Tang, Kitchener (CA); Di Wang, Pittsburgh, PA (US)

(72) Inventors: Ming Li, Waterloo (CA); Yang Tang, Kitchener (CA); Di Wang, Pittsburgh, PA (US)

( * ) Notice: Subject to any disclaimer, the term of this patent is extended or adjusted under 35 U.S.C. 154(b) by 268 days.

(21) Appl. No.: 13/749,333

(22) Filed: Jan. 24, 2013

(65) Prior Publication Data

US 2014/0039873 A1    Feb. 6, 2014

Related U.S. Application Data

(60) Provisional application No. 61/590,275, filed on Jan. 24, 2012.

(51) Int. Cl.
  *G06F 17/28*    (2006.01)

(52) U.S. Cl.
  CPC .......... *G06F 17/289* (2013.01); *G06F 17/2854* (2013.01)

(58) Field of Classification Search
  CPC ...................................................... G06F 17/28
  USPC ........................................................ 704/2–8
  See application file for complete search history.

(56) References Cited

U.S. PATENT DOCUMENTS

| | | | |
|---|---|---|---|
| 5,867,811 A * | 2/1999 | O'Donoghue | 704/1 |
| 6,085,162 A * | 7/2000 | Cherny | 704/277 |
| 6,182,026 B1 * | 1/2001 | Tillmann et al. | 704/2 |
| 6,195,631 B1 * | 2/2001 | Alshawi et al. | 704/4 |
| 6,236,958 B1 * | 5/2001 | Lange et al. | 704/8 |
| 2009/0083023 A1 * | 3/2009 | Foster et al. | 704/3 |
| 2009/0326913 A1 * | 12/2009 | Simard et al. | 704/2 |

* cited by examiner

*Primary Examiner* — Jesse Pullias
(74) *Attorney, Agent, or Firm* — Norton Rose Fulbright Canada LLP

(57) ABSTRACT

A computer implemented machine translation system and method is provided that improves the accuracy of output from one or more machine translation systems by applying one or more data correction routines. A data correction routine is provided that includes information distance analysis of one or more sets of machine translation information to a set of text elements related to the domain and stored to a database. The system and method generate as output corrected text elements related to a meaning intended by a user from whom the machine translation information was captured.

20 Claims, 3 Drawing Sheets

SYSTEM, METHOD AND COMPUTER PROGRAM FOR CORRECTING MACHINE TRANSLATION INFORMATION

FIELD OF THE INVENTION

The present invention relates generally to methods and systems for machine translation of languages, and more particularly to methods and systems for correcting the output of machine translation of languages.

BACKGROUND OF THE INVENTION

Various machine translation technologies for translation of one language to another are known, as well as techniques and technologies for improving the accuracy of machine translation of languages.

There is also significant demand for machine translation embodied in an interface to computer systems and computer programs. This includes use of machine translation as a means of activating cross language functions on a computer system or computer program, especially for example when a user is travelling to other countries.

There are generally two categories of machine translation methods and systems. The first category includes statistics based machine translation methods and systems which generally require a large bilingual training set to improve the accuracy of the machine translation output. The output of such method and system usually has better word coverage, but the grammar is typically poor, which makes it very hard to be understood. The second category includes grammar based machine translation methods and systems. The accuracy of this system is ensured by grammar patterns which are often prepared manually for a given subject area. Therefore, the vocabulary coverage is usually very limited, and it is difficult to extend such methods and systems to other languages or other subject areas.

These disadvantages are a practical obstacle to the design and implementation of machine translation technologies that are accurate enough for widespread user adoption. For example, the development of cross language Question Answering (QA) systems to enable cross language question answering are not practical based on prior art solutions because such an application requires the grammar of translation results to be correct and the scope of the domain to be relatively unlimited.

Thus, there is a need for a computer system, computer program, and computer implemented method that addresses at least some of the above mentioned obstacles. There is a further need for a QA system that provides improved language translation accuracy and therefore enables cross language QA services that address a significant segment of the population of interest, including individuals for whom English is not their first language.

SUMMARY OF THE INVENTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect, there is provided a computer implemented machine translation method comprising the steps of (a) capturing one or more elements of a source language using a source language analysis means, the elements of the source language relating to a domain; (b) using one or more machine translation utilities so as to generate one or more sets of target language information based on the one or more elements of source language; (c) applying one or more correction routines to the one or more sets of target language information that include information distance analysis of the one or more sets of target language information to a set of text elements related to the domain and stored to a database; and (d) constructing one or more data outputs related to a meaning intended by a user by the one or more elements of source language.

In another aspect of the invention the information distance analysis includes clustering the one or more elements of translation results using a cluster of related records in the database.

In another aspect of the invention, the one or more data outputs are generated based calculation of a $D_{min}$ operation to the one or more elements of source language and a $D_{max}$ operation to the text elements, as well as the mutual information on these data.

An Internet implemented system is also provided that provides machine translation services to a network of computer devices, where the machine translation data services include data correction in accordance with the method of the invention.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 1:
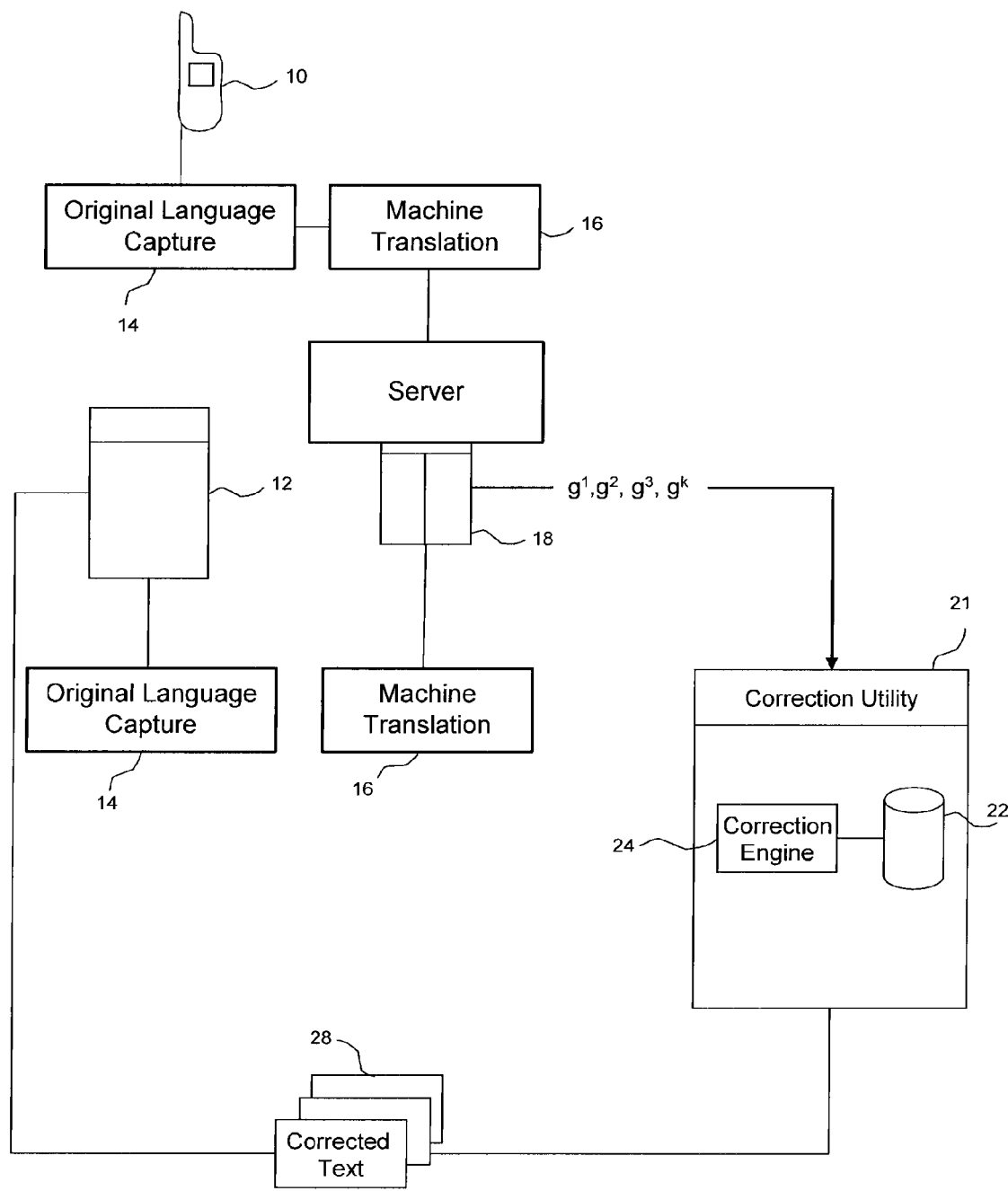
FIG. 1 depicts an exemplary system diagram illustrating the network architecture for implementing the present invention in accordance with an embodiment.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF PREFERRED EMBODIMENTS

The present disclosure relates to a computer network implemented system, a computer network implemented method, and a computer network architecture that enables improved machine translation of languages using a novel mechanism for correction which enables a cross language input means to various computer devices and computer programs which performs significantly better than prior art solutions.

The present disclosure also includes a computer program for implementing the method functions described, which may be implemented for example as a server application executed on one or more servers. The computer network architecture described herein enables delivery of improved machine translation features to mobile computer devices, as one example of implementation of the technology. A skilled reader will understand that various computer network architectures are possible that implement the novel and innovative features described in the present disclosure.

An illustrative method in accordance with an embodiment of the invention is described below, and a representative system and computer network implementation are described further below.

By way of illustration, the present invention may be explained by reference to a QA system that implements a method in accordance with an embodiment of the present invention. In one aspect of the invention, a computer implemented method is provided which applies information distance analysis to machine translation results, namely, a set of query outputs (for example machine translation results generated from one or more third party machine translation platforms) relative to a set of meaningful queries, from which the present system and method can reconstruct the intended query.

Operation of the present invention may be illustrated by referring to five test cases, each using 200-300 questions from a test set not contained in a database (22) (e.g. shown in FIG. 1) linked to the system. In experiments conducted by the inventors, the system of the invention reduced the number of errors by 50-80% for Chinese-English translation, in comparison to the performance of marketing leading machine translation software such as translation applications available from GOOGLE™, or MICROSOFT™.

As explained earlier, the less than optimal performance of various prior art machine translation methods and systems may be explained by: (i) A poor set of rules for grammar, and (ii) No detailed knowledge of a specified subject area.

The present invention is based on a unique and innovative machine translation improvement methodology, which will now be described in more detail with reference to the figures.

Figure 2:
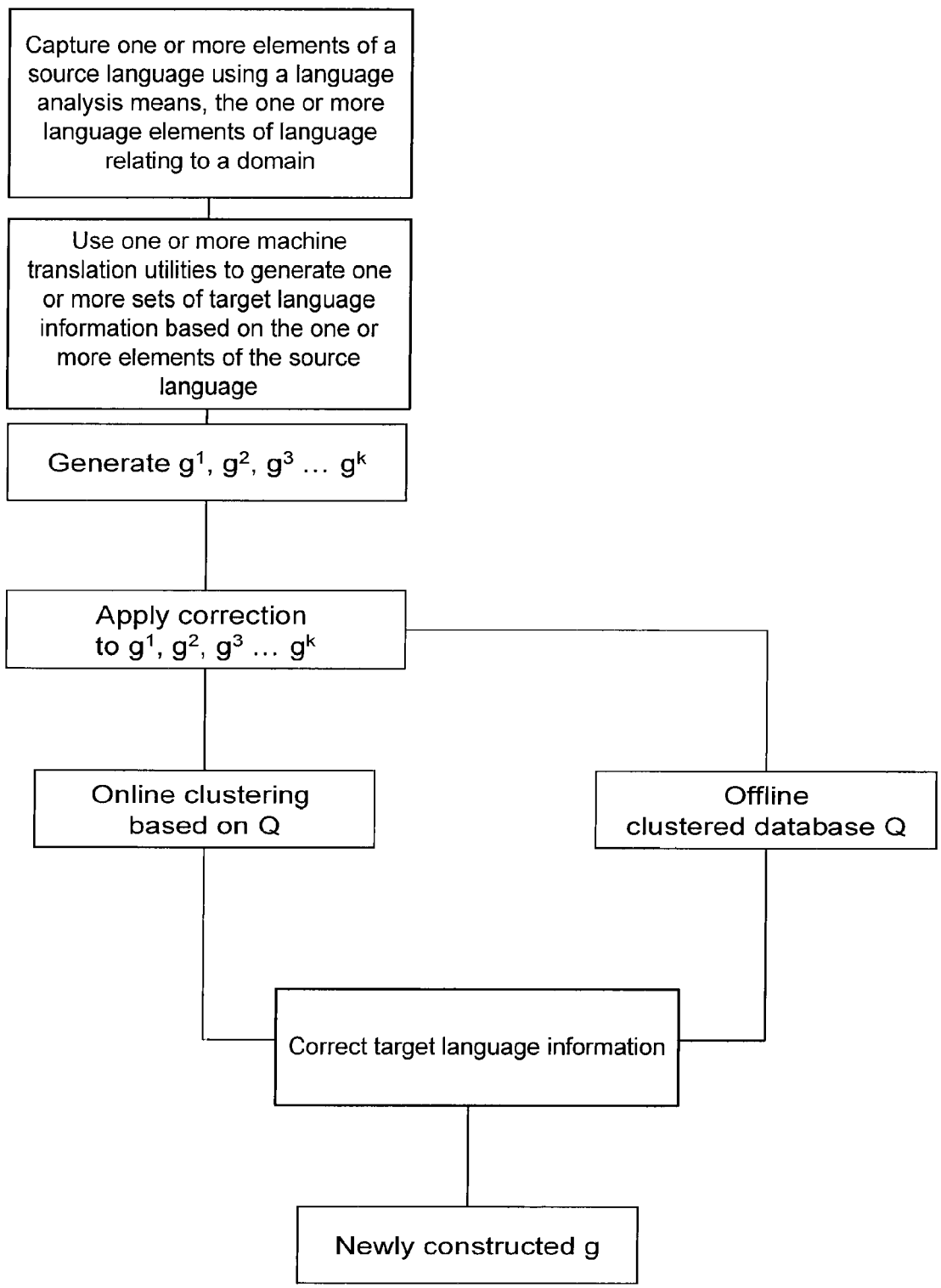
FIG. 2 is a workflow diagram illustrating a representative workflow in accordance with an embodiment of the invention.

Referring to FIG. 1, shown is an exemplary system diagram illustrating the network architecture for implementing the present invention in accordance with an embodiment. Database (22) is configured to include information from a relevant domain or subject area, obtained for example from the Internet or available databases, and that may optionally be enhanced. In FIG. 2, the database is shown to include Q data sets. In an embodiment, the database (22) entries may relate to a particular domain or language component. For example, FIGS. 1 and 2 illustrate the use of an embodiment of the present invention as a QA service, and therefore database (22) contains a multitude of possible queries that a user may make. For example, a current implementation of the database (22) includes 35 million queries obtained from the Internet ("database queries").

Database (22) is used to correct queries from one or more machine translation systems (referred to as "output queries"), in accordance with the present illustrative embodiment of the invention. The output queries from the one or more machine translation systems may or may not be correct. However, as explained below, depending on the factors described there is a strong likelihood that the accuracy of the output queries may be low in specific instances, and therefore the intent of the output queries may only be partially recognized by a machine translation software package.

Still referring to FIG. 1, accordance with one aspect of the present invention, a correction utility or component (21) is operable to use the database queries as templates or patterns to generate the original intended question from the machine translation input or output queries. As shown in FIG. 1, the correction utility (21) may incorporate a correction engine (24) and a database (22). The correction engine (24) embodies the operations described herein, and based on such operations the correction utility (21) utilizing one or more databases such as database (22) is operable to generate corrected text (28). Corrected text (28) may in turn be used to support a variety of applications including, for example, an enhanced QA service implemented using a QA server (not shown). A QA server may, for example, include or link to the correction utility (21) of the present invention.

Providing a method and system for enabling the use of the database queries in this way, and to enable generation of the original intended question is not trivial. It is not known which, if any, of the output queries is the original intended question. If there is conflict between the output query indicated by the machine translation system or computer program as being the original intended questions, and the database query indicated to be the original intended question, it is difficult to resolve this conflict. Often, none of the output queries or the database queries is exactly correct. In these circumstances, there is a need for a mechanism to generate nonetheless the original intended question, which is what the present invention accomplishes in a new and innovative way. The following illustrative example explains how this is accomplished by the present invention.

Information Distance

This section explains the theory behind the concept of information distance, and the novel application of this theory to the technical problem addressed by the present method and system.

Kolmogorov complexity was invented in the 1960's. The concept may be explained in relation to an universal Turing machine U. The Kolmogorov complexity of a binary string x condition to another binary string y, $K_U(x|y)$, is the length of the shortest (prefix-free) program for U that outputs x with input y. Since it can be shown that for a different universal Turing machine U', the metric differs by only a constant, we will just write $K(x|y)$ instead of $K_U(x|y)$. We write $K(x|\epsilon)$, where $\epsilon$ is the empty string, as $K(x)$. We call a string x random if $K(x) \geq |x|$. A skilled reader will appreciate further details of Kolmogorov complexity.

$K(x)$ defines the amount of information in x. In one aspect, the present invention provides a good departure point for defining an "information distance" between two objects for the purposes of correction. There have been studies of the energy cost of conversion between two strings x and y. A skilled reader will know that John von Neumann for example hypothesized that performing 1 bit of information processing costs 1KT of energy, where K is the Boltzmann's constant and T is the room temperature. In the 1960's, observing that reversible computations can be done for free, Rolf Landauer revised von Neumann's proposal to hold only for irreversible computations.

Starting from this well known von Neuman-Landauer principle, the minimum number of bits needed to convert between x and y to define their distance may be defined. Formally, with respect to a universal Turing machine U, the cost of conversion between x and y may be defined as:

$$E(x,y)=\min\{|p|:U(x,p)=y,U(y,p)=x\} \quad [1]$$

It is clear from the above that $E(x,y) \leq K(x|y)+K(y|x)$. The following optimal result may be obtained, modulo $\log(|x|+|y|)$:

$$E(x,y)=\max\{K(x|y),K(y|x)\}. \quad \text{Theorem 1.}$$

This enables the calculation of information distance between two sequences x and y as:

$$D_{max}(x,y)=\max\{K(x|y),K(y|x)\}.$$

This distance $D_{max}$ is shown to satisfy the basic distance requirements such as positivity, symmetricity, and triangle inequality. Furthermore, $D_{max}$ is "universal" in the sense that $D_{max}$ always minorizes any other reasonable computable distance metrics.

Despite its good properties and many applications, the max distance $D_{max}(x,y)$ has several problems when we consider only partial matching where the triangle inequality fails to hold and the irrelevant information must be removed. Thus, the present system and method includes a complementary information distance to resolve this problem. In Eq (1), in effect the calculation determines the smallest number of bits that must be used to reversibly convert between x and y. To remove the irrelevant information from x or y, in one aspect the technology described defines, with respect to a universal Turing machine U, the cost of conversion between x and y to be:

$$E_{min}(x,y)=\min\{|p|:U(x,p,r)=y,U(y,p,q)=x,|p|+|q|+|r|\leq E(x,y)\},\quad[2]$$

To interpret, the above definition separates r from x and q from y. Modulo an $O(\log(|x|+|y|))$ additive term, we have proved the following theorem:

$$D_{min}(x,y)=\min\{K(x|y),K(y|x)\}. \qquad\text{Theorem 2.}$$

Thus the present technology now defines $D_{min}(x,y)=E_{min}(x,y)$ as a complementary information distance that disregards irrelevant information. $D_{min}$ is symmetric, but it does not satisfy triangle inequality. Thus, $D_{min}$ may be used as an operation for enabling information distance operations as between a first set of entities, and a second set of entities, where there may be irrelevant information in one or more of the sets, for the purpose of determining the most accurate entity.

Min-Max Distance

In a further aspect of the invention, the technology is configured to formulate the problem in the frame of information distance. One of the novel aspects of the present method and system may be understood as an operation for determining q based on a combined $D_{min}$ and $D_{max}$ operation or min/max information distance operation, as further explained below.

Given a Question Database Q, and k input questions from one or many machine translation systems, say $I=\{q_1,\ldots,q_k\}$, $k\leq 3$ for example from the Google machine translation server or Microsoft machine translation server, which was used in testing of the present method and system. The goal is to compute the user's intended question q. It could be one of the qi's; it could also be a combination of all k of them; it could also be one of the questions in Q that is close to some parts of the qi's.

The present technology provides a mechanism for finding the most plausible question q such that q fits one of the question patterns in Q, and q has "close distance" to I. We will assume that Q contains almost all question patterns. Later in this disclosure, this assumption is explained further.

Thus we can formulate our problem as: Given Q and I, find q such that it minimizes the sum of "distances" from Q to q, and q to I, as shown in the following:

$$I \longleftrightarrow q \longleftrightarrow Q$$

In this illustrative example, Q is a very large database (e.g. tens of millions) of user asked questions. We will assume q is "similar" to one of those. For example, a Chinese QA user might have asked " . . . (How many legs does a spider have)", but in Q, there might be questions like "How many legs does a crab have" or "How many legs does a horse have?". I may contain such output translation results as "How many legs does a spider have?" based on results of the machine translation software. Since Q is very large, use of the $D_{max}$ measure may not be optimal, as most of information in Q are irrelevant, and therefore in the present system and method $D_{min}(q,Q)$ is used for establishing the information distance between q and Q. However, for distance between q and I, we can use $d_{max}(q,I)$ to measure the information distance. Thus given I,Q, we wish to find q that minimizes the following function:

$$\delta D_{min}(q,Q)+D_{man}(I,q), \qquad[3]$$

where $D_{min}$ measures information distance between q and Q with irrelevant information removed; and $D_{max}$ is the information distance between I and q. We know $$D_{min}(x,y)=\min\{K(x|y),K(y|x)\},$$

$$D_{max}(x,y)=\max\{K(x|y),K(y|x)\}.$$

Thus, $D_{min}(q,Q)=K(q|Q)$, because Q is very large and q is just one question. Notice that $\delta$ is a coefficient that determines how much weight we wish to give to a correct template or pattern in Q.

Thus the operation as applied to a set of queries may be expressed as:

$$\delta K(q|Q)+\max\{K(q|I),K(I,q)\}. \qquad[4]$$

Observations: If $\delta>1$, then q=I does not minimize formula (4). If $\delta$ is too large, then q=$\epsilon$ might minimize formula (4). There is a tradeoff: sometimes a less popular pattern (taking more bits in the $D_{min}$ term) might fit/better (taking fewer bits in the $D_{max}$ item) and a more popular pattern (taking fewer bits in the $D_{min}$ item) might miss one or two key words in/taking more bits to encode in the $D_{max}$ item. $\delta$ is optimized for this tradeoff.

Database Encoding

In another aspect of the invention, the issues outlined in the paragraph above may be resolved using one or more of the following techniques.

Encode q using Q in the first term. It is a problem to encode an item with respect to a big set.

Encode q using I or encode I using q, and take whichever larger, in the second term.

Find all the possible candidates q, and $q_0$ that minimize Formula (4).

Q is very large and contains different "types" of questions. For each type of questions, we could extract one or more question templates. In this way, Q could be considered as a set of templates and each template, denoted as p, covers a subset of questions from Q. When encoding g, we do not have to encode q from Q directly. Instead we encode q with respect to the patterns or templates of Q. For example, if a pattern p in Q appears N times in Q. Then we can use $\log_2(\text{Total}/N)$ bits to encode the index for this pattern. Given the pattern p, we encode q with p by encoding their word mismatches. There will be a tradeoff between the encoding of p and the encoding of q given p. A common pattern may be encoded with a few bits, but it may require more bits to encode a specific question using this pattern. For example, the template "who is the mayor of City Name" requires more bits to encode than the template "who is the mayor of Noun", because the former is a smaller class than the latter. However the first template will require fewer bits to generate a question "who is the mayor of Waterloo", since it requires fewer bits to encode Waterloo from the class "City Name" than from the class "Noun".

Such patterns may be extracted by pre-processing or be extracted dynamically based on analysis of the output queries. Thus, in one aspect of the invention, patterns are only extracted from relevant questions based on I, denoted as Q'. Q' may for example be organized in a hierarchical way. Similar questions may be mapped to a cluster and similar clusters may be mapped to a bigger cluster. One pattern may be extracted from each cluster using for example a multiple alignment algorithm. This pattern should be as specific as possible, while at the same time covering all the questions in the cluster. The higher the cluster is in the hierarchy structure, the more general the pattern will be. So our hierarchical clustering technique, in one aspect, may ensure that all the possible patterns are extracted from relevant questions. It should be understood that this aspect of the operation of the correction engine (24) may use one or more semantic and/or syntactic information techniques, including POS tagger, Name Entity Recognition, Wordnet and WikiPedia. For example, given a cluster of three questions:

Who is the mayor of Toronto?
Who is the president of the United States?
Who is the senator of New York?

The correction engine is operable to extract a pattern such as: Who is the Leader of Location? "Mayor", "president" and "senator" are all mapped to the Leader class, while "Toronto", "United States" and "New York" all belong to the Location class.

If pattern p is treated by correction engine (24) as a sentence, the problem of item-to-set encoding depends on the item-to-item encoding, same as the computation of K(q|I) and K(I|q). In fact, to correct and convert a sentence from another sentence, we only need to encode the word mismatches and the missing words. An optimal alignment between two sentences may be generated for example using a standard dynamic programming algorithm. For example, content engine (24) encodes a missing word by minus logarithm of their probabilities to appear at the said locations and encodes the mismatches by calculating their semantic and morphology similarities. It requires fewer bits to encode between synonyms than antonyms.

The last problem to consider in Formula (4) is the selection of candidate questions g. It may not be possible to search through the whole question space. We only consider the possible question candidates that is relevant with the input and that could be matched by at least one of our templates from database (22). Furthermore, a bigram language model may be applied by the correction engine (24) to filter questions with low trustiness. The language model may be trained in our background question set. The value $\delta$ is trained by operations of correction engine (24). In the method and system of the present invention, the $\delta$ value may be a function of the lengths of the output question.

It is optimal for a machine translation system to respond instantaneously. The speed requirement forced us to adapt some tradeoffs in the implementation, for example not considering all possible patterns. In other words, the content engine (24) may apply one or more operations to minimize the number of possible patterns analyzed, using one or more pre-configured thresholds.

Further Details Regarding Database Q

We have performed an experiment to test the hypothesis that Q contains almost all common question types. The test set T contains 300 questions, selected (with the criteria: no more than 11 words or 65 letters, one question in a sentence, no non-English letters) from a Microsoft QA set at: research.microsoft.com/en-us/downloads/88c0021 c-328a-4148-a158-a42-d7331 c6cf.

We found that all but three, although this test set is not included in the database Q, 99% of them, have corresponding patterns in Q. The only three questions that do not have similar patterns, in a strict sense, in Q are: Why is some sand white, some brown, and some black? Do flying squirrels fly or do they just glide? Was there ever a movement to abolish the electoral college?

Examples in Operation

Google machine translation at google.com and Microsoft machine translation was used to compare the accuracy of translations with our system. The results were judged manually.

In a test set of 428 questions collected from web, Google's accuracy was found to be approximately 27.5%, Microsoft's accuracy was approximately 29.7% and the accuracy of the present system and method was found to be approximately 75.6%.

Further details of the tests are provided below:

---

Original question:
...
Google machine translation output:
China, the number of people.
Microsoft machine translation output:
How many people in China.
Output from the present system:
How many people are in China

---

Original question:
...
Google machine translation output:
Plane from Beijing to Toronto
Microsoft machine translation output:
From Beijing to Toronto by plane how long will it take
Output from the present system:
How long does it take to get from Beijing to Toronto

---

Original question:
...
Google machine translation output:
Snow Leopard can run fast.
Microsoft machine translation output:
Snow Leopard can run much faster.
Output from the present system:
How fast do Snow Leopard run?

---

Original question:
...
Google machine translation output:
Robinson Crusoe who wrote this book.
Microsoft machine translation output:
Lu Binsun drift in min who wrote this book.
Output from the present system:
Who wrote this book Robinson Crusoe.

---

Advantages

As explained above, the system of the present invention is operable to provide significant improvements over the performance of existing machine translation software. This enables for example a cross language personal assistant as well as QA system on a smartphone. This would provide a powerful and convenient tool for people who may be travelling, individuals with interests in foreign knowledge, people with impaired vision, children who wish their Talking Tom or R2-D2 to be more smart, and mobile device users as a whole.

Illustrative Implementation of the Invention

The system of the present invention is best understood by reference to FIG. 1. A computer implemented method in accordance with the presented invention is shown as a workflow in FIG. 2.

Computer device (10) may be any manner of computer device, whether a laptop, desktop computer, tablet computer or otherwise, and is shown as a mobile device (10) in FIG. 1. The computer device (10) includes or is linked to an original language capture utility (14), and may also include or be linked to one or more machine translation utilities (16). The machine translation utilities (16) generate one or more digital outputs conforming to interpretations of the intended sentences or sentence fragments. As explained above, the accuracy of the output from the machine translation utilities (16) is often inaccurate. For this reason, one or more components are configured to apply the correction techniques described above.

The machine translation utility may be implemented on the device (10), or the device (10) may be connected to a translation server (18), which in turn may include or be linked to one or more machine translation utilities (16).

It should be understood that database (22) relates preferably to a particular domain. The example illustrated in FIG. 1 illustrates a representative implementation of a QA service, and therefore the input to the correction utility (21) consists of queries. Also, multiple databases (22) may be used, each database (22) relating for example to a particular domain.

The system of the present invention may include a classifier that is operable to analyze the output of the machine translation utilities (16) and based on such analysis determine for example the nature of the output from the machine translation utilities so as assign the output to a particular database (22) that matches the domain of the output. For example, the classifier may be operable to determine that the output is a question and therefore should be assigned to the database (22) that relates to queries as opposed to for example a database comprising commands.

The correction utility (21) of the present invention is operable to use the output queries, and is further operable, if required, to construct the intended query, as explained above. The correction utility (21) may include or be linked to one or more utilities configured to support the operations described, including the construction of the output of the system, namely the corrected machine translation output. For example, the correction utility may include a semantic engine that enables the correction utility (21) to use the entries in database (22) as templates as illustrated in the examples above.

In an embodiment, the correction utility (21) may be implemented for example as a web service or a cloud service as further explained below. The correction utility (21) may be made part of a web server, implemented for example as a server application. One or more computer devices may call on the system of the present invention, via a communication network, to seek improvement of the accuracy of user generated queries, generated using one or more machine translation routines. It should also be understood that the correction utility (21) may be implemented as part of a QA server, that is operable to correct machine translation output so as to generate corrected text (28), and based on corrected text (28), provide answers that match the corrected text (28) corresponding to queries.

The correction utility (21) may also be integrated with existing machine translation technologies.

The system and method of the present invention may be implemented with various systems and applications for the purpose of enhanced cross language functionality. For example, it should be understood that various embodiments of the present system and method contemplate the incorporation of cross language search systems, cross language control systems, cross language online learning systems, a help utility for assisting with device or software functions such as for example a smart phone personal assistance system and so on.

Related Applications

It should be understood that the method of the present invention may also be used to correct numerous grammatical errors and spelling mistakes in the various questions loaded to database (22) which have been obtained from the Internet and therefore may require correction. Application of the correction method makes the QA process more accurate by providing a more correct database.

The method and system of the present invention may also be adapted to create an automatic writing assistant, which would be suitable for a well-defined domain. For example, a writing assistant can be used to convert the queries in a keyboard-input QA system to answerable queries.

Computing Environment

The description above discloses at a high level the various functions of the proposed control/management solution for a plurality of devices at the location.

Figure 3:
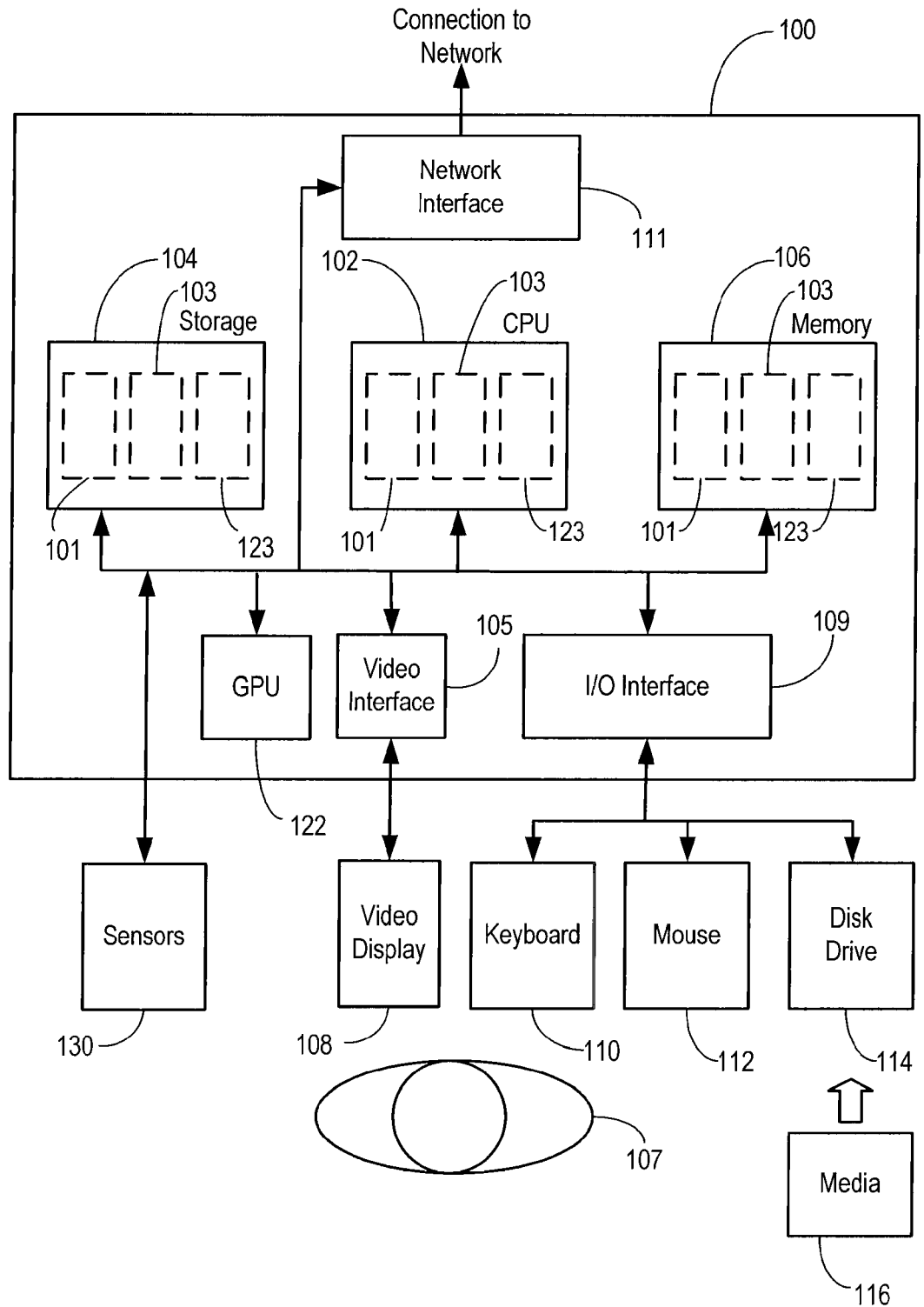
FIG. 3 illustrates a generic computer implementation of the computer program aspects of the present invention.

In order to provide additional context for various aspects of the subject innovation, FIG. 3 and the following discussion are intended to provide a brief, general description of a suitable computing environment in which the various aspects of the present invention can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices. For example the database (22) may be located remotely from a computer device that includes other elements of the correction utility, such that the correction utility queries the database for the cluster of related queries as described above.

A computer (such as the computer(s) illustrated in the architecture described above) typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer. Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system of the present invention represents a collection of hardware and software elements that enable a user to manage a variety of device and information objects associated or generated by these devices, leveraging in-the-cloud resources in a new way.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Cloud Computing Generally

As mentioned above, the correction utility of the present invention may be implemented as part of a cloud service. "Cloud computing" includes Internet based computing where shared resources, software and data are provided on demand. A "cloud" therefore can refer to a collection of resources (e.g., hardware, data and/or software) provided and maintained by an off-site party (e.g. third party), wherein the collection of resources can be accessed by an identified user over a network. The resources can include data storage services, word processing services, and many other general purpose computation (e.g., execution of arbitrary code) and information technological services that are conventionally associated with personal computers or local servers.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In general, the concepts of "virtual" and "cloud computing" include the utilization of a set of shared computing resources (e.g. servers) which are typically consolidated in one or more data center locations. For example, cloud computing systems may be implemented as a web service that enables a user to launch and manage computing resources (e.g., virtual server instances) in third party data centers. In a cloud environment, computer resources may be available in different sizes and configurations so that different resource types can be specified to meet specific needs of different users. For example, one user may desire to use small instance as a web server and another larger instance as a database server, or an even larger instance for processor intensive applications. Cloud computing offers this type of outsourced flexibility without having to manage the purchase and operation of additional hardware resources within an organization.

A cloud-based computing resource is thought to execute or reside somewhere on the "cloud", which may be an internal corporate network or the public Internet. From the perspective of an application developer or information technology administrator, cloud computing enables the development and deployment of applications that exhibit scalability (e.g., increase or decrease resource utilization as needed), performance (e.g., execute efficiently and fast), and reliability (e.g., never, or at least rarely, fail), all without any regard for the nature or location of the underlying infrastructure.

A number of factors have given rise to an increase in the utilization of cloud computing resources. For example, advances in networking technologies have significantly improved resource connectivity while decreasing connectivity costs. Advances in virtualization technologies have increased the efficiency of computing hardware by improving scalability and making it possible to more closely match computing hardware resources to the requirements of a particular computing task. Additionally, virtualization technologies commonly deployed in cloud computing environments have improved application reliability by enabling failover policies and procedures that reduce disruption due to an application or hardware failure.

It should be understood that the present invention may be extended by linking the invention with other technologies or processes useful in the monitoring, control or management of a variety of devices, for a variety of purposes.

The invention claimed is:

1. A computer implemented machine translation method, comprising:
   capturing one or more elements of a source language using a language analysis means, the one or more elements of language relating to a domain;
   using one or more machine translation utilities so as to generate one or more sets of target language information based on the one or more elements of the source language;
   applying one or more correction routines to the one or more sets of machine translation information, the correction routines configured to perform information distance analysis of the one or more sets of machine translation information relative to a set of text elements related to the domain and stored to a database, wherein the information distance analysis includes determination of an information distance defining a minimum number of bits required to transform one string into another string; and
   constructing one or more data outputs related to a meaning intended by a user by the one or more elements of source language.

2. The method of claim 1, wherein the information distance analysis comprises:
(a) a max distance $D_{max}(x,y)$ operation; and
(b) a complementary information distance operation to address partial matching and removes irrelevant information.

3. The method of claim 2, wherein the complementary information distance operation defines $D_{min}(x,y)=E_{min}(x,y)$ that when executed yields an information distance between a first set of entities, and a second set of entities, that determines the most accurate entity by disregarding irrelevant information, where there may be irrelevant information in one or more of the sets, for the purpose of determining the most accurate entity.

4. The method of claim 3, wherein the information distance analysis provides a mechanism for finding the most plausible question q such that q fits one of the question patterns in Q, and q has a close distance to I.

5. The method of claim 3 wherein the information distance analysis operation, given Q and I, finds q such that it minimizes the sum of distances from Q to q, and q to I, thereby yielding the most accurate entity.

6. The method of claim 3, wherein it is assumed that Q contains almost all question patterns.

7. The method of claim 1, wherein the information distance analysis includes clustering one or more elements of machine translation information using a cluster of related records in the database.

8. The method of claim 1, wherein one or more data outputs are generated based calculation of a $D_{min}$ operation to the one or more elements of source language and a $D_{max}$ operation to the text elements, as well as the mutual information of the one or more elements of source language and the text elements.

9. The method of claim 1, wherein the information distance satisfies one or more distance requirements including at least one of positivity, symmetricity, and triangle inequality.

10. The method of claim 1, wherein a domain of the meaning intended by the user includes at least one of a question and a command.

11. A computer implemented system for corrected machine translation, comprising:
(a) one or more computers, at least one computer program component executable on the one or more computers, the computer program component including a correction utility including or linked to one or more databases each including text elements related to a domain, wherein the correction utility is operable to:
(i) receive from one or more machine translation utilities one or more sets of machine translation information based on one or more elements of source language captured from a user and associated with an intended meaning, the one or more sets of machine translation information associated with a domain;
(ii) apply one or more correction routines to the one or more sets of machine translation information, the one or more correction routines adapted to perform at least information distance analysis of the one or more sets of machine translation information relative to the text elements related to the domain and stored to the database, wherein the information distance analysis includes determination of an information distance defining a minimum number of bits required to transform one string into another string; and
(iii) construct one or more data outputs related to a meaning intended by the user by the one or more elements of source language.

12. The system of claim 11, wherein the information distance analysis comprises:
(a) a max distance $D_{max}(x,y)$ operation; and
(b) a complementary information distance operation to address partial matching and removes irrelevant information.

13. The system of claim 12, wherein the complementary information distance operation defines $D_{min}(x,y)=E_{min}(x,y)$ that when executed yields an information distance between a first set of entities, and a second set of entities, that determines the most accurate entity by disregarding irrelevant information, where there may be irrelevant information in one or more of the sets, for the purpose of determining the most accurate entity.

14. The system of claim 13, wherein the information distance analysis when executed provides a mechanism for finding the most plausible question q such that q fits one of the question patterns in Q, and q has a close distance to I.

15. The system of claim 14, wherein the information distance analysis operation when executed, given Q and I, finds q such that it minimizes the sum of distances from Q to q, and q to I, thereby yielding the most accurate entity.

16. The system of claim 11, wherein the information distance analysis when executed includes clustering one or more elements of machine translation information using a cluster of related records in the database.

17. The system of claim 11, wherein the one or more correction routines are adapted to correct at least one of a grammatical error and a spelling mistake.

18. The system of claim 1, the system further comprising a classifier utility configured to analyze the one or more sets of machine translation information to determine the domain of the output of the one or more machine translation utilities.

19. The system of claim 18, wherein the domain of the output of the one or more machine utilities includes at least one of a question and a command.

20. The system of claim 19, wherein the classifier utility is further configured to classify the one or more sets of machine translation information based on the determination of the domain of the output of the one or more machine translation utilities.

* * * * *